Patented July 21, 1936

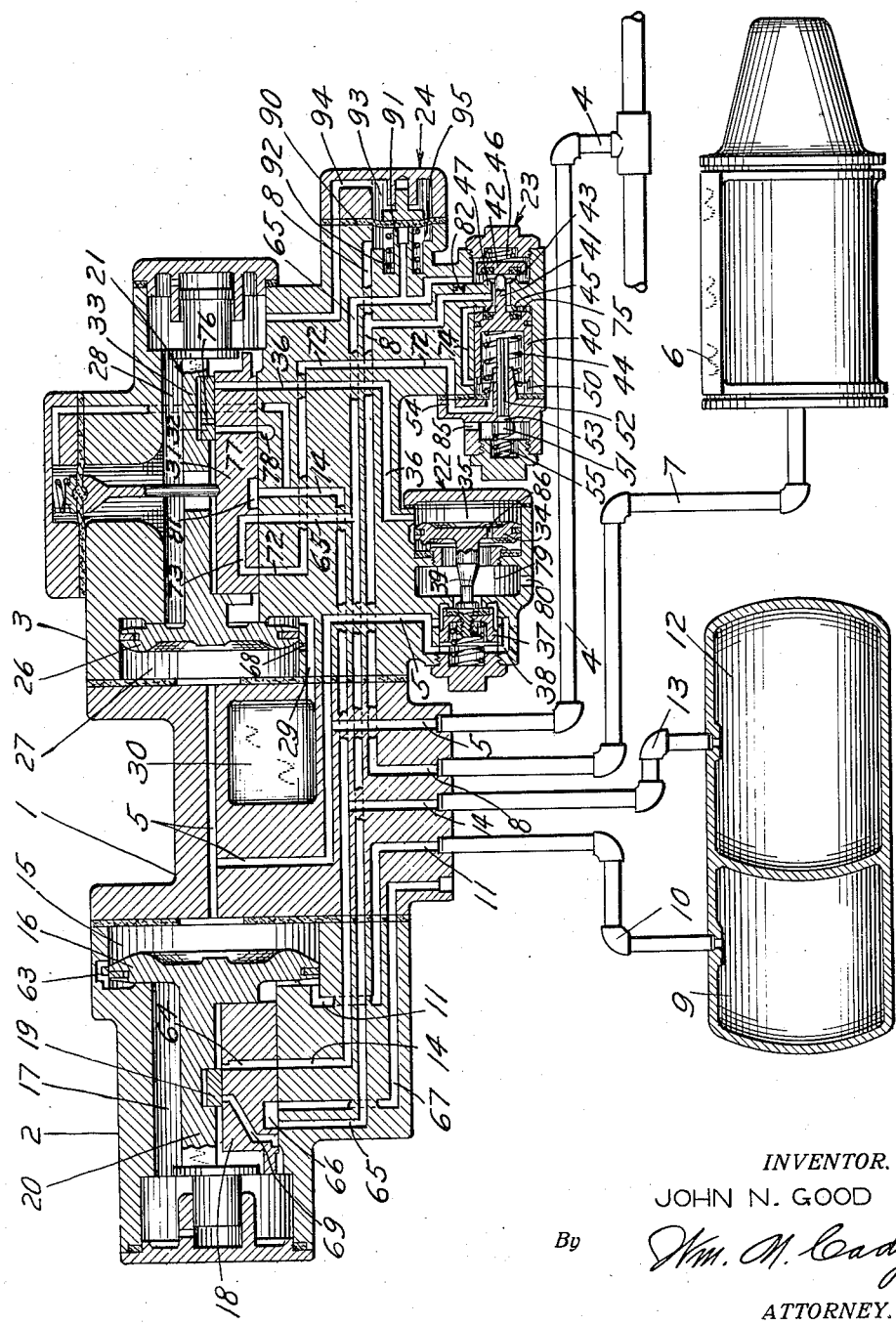

2,048,332

UNITED STATES PATENT OFFICE 2,048,332

FLUID PRESSURE BRAKE

John N. Good, Wilmerding, Pa., assignor to The Westinghouse Air Brake Company, Wilmerding, Pa., a corporation of Pennsylvania Application January 30, 1935, Serial No. 4,033

12 Claims. (Cl. 303—46)

This invention relates to fluid pressure brakes in which the brakes are applied and released by varying the fluid pressure in the brake pipe.

It has heretofore been proposed to provide brake equipment of the above type in which in effecting an emergency application of the brakes fluid under pressure is initially supplied to the brake cylinder at a rate sufficient to insure the movement of the brake cylinder piston so as to cause the brake shoes to engage the wheels, after which fluid is supplied to the brake cylinder at a slow rate for a period of time sufficient to insure that the brakes will be applied on all of the cars of the train before the brakes have been applied on the cars at the head end of the train with such force in advance of applying the brakes on the cars at the rear end of the train as to result in the running in of the slack in the train at such a rate that excessive shocks will be produced. After the brake cylinder build up delay period and after the slack has run in, the brake cylinder pressure is then permitted to build up at a rapid rate.

A fluid pressure brake equipment having the above feature by which in an emergency application there is an initial inshot of fluid under pressure to the brake cylinder followed by a slow build up of brake cylinder pressure, and thereafter followed by a final inshot of fluid under pressure to the brake cylinder is disclosed in U. S. Patent No. 2,013,231, issued February 18, 1936 to Clyde C. Farmer.

In the brake equipment shown in the above identified application a restriction in the rate of flow to the brake cylinder is produced by valve means which is subject to the pressure of fluid supplied to the brake cylinder, and which during a service application of the brakes is rendered inoperative by the application of fluid under pressure to both sides of the abutment which controls the operation of the valve means.

In an emergency application of the brakes the movable abutment operates to close the valve when the brake cylinder pressure on one side of the abutment has been increased to a degree sufficient to overcome the pressure of a spring acting on the opposite side of the abutment. Normally the spring side of the abutment is connected to the atmosphere, and on effecting an emergency application the communication through which the spring side of the abutment is vented to the atmosphere is cut off, and possible leakage of fluid under pressure to the spring side of the abutment may then interfere with the desired operation of the inshot valve means.

One object of my invention is to provide means for insuring that the desired operation of the inshot valve means will not be interfered with by possible leakage to the spring side of the operating abutment associated with the inshot valve means.

A further object of my invention is to provide a brake controlling valve device having a three stage build up of brake cylinder pressure in emergency feature with one stage controlled by valve means operable subject to the pressure of fluid supplied to the brake cylinder and having means to insure that the operation of this valve means will not be affected by leakage of fluid around the elements associated with the valve means or with other portions of the brake controlling valve device.

Other objects of the invention and features of novelty will be apparent from the following description taken in connection with the accompanying drawing which is a diagrammatic view of a fluid pressure brake equipment for a car including a brake controlling valve device shown in section and embodying my invention.

The equipment shown in the drawing is similar to that shown in the patent hereinbefore referred to, but only so much of the equipment is illustrated as is deemed necessary to a clear understanding of the present invention.

As shown in the drawing the equipment may comprise a pipe bracket 1 to which is secured a triple valve casing 2 and an emergency valve casing 3. The brake pipe 4 is connected to a passage 5 in the pipe bracket 1, a brake cylinder 6 is connected by a pipe 7 to a passage 8 in the pipe bracket 1, an auxiliary reservoir 9 is connected by a pipe 10 to a passage 11, and the emergency reservoir 12 is connected by a pipe 13 to a passage 14 in the pipe bracket.

The triple valve casing 2 has a piston chamber 15 connected to the brake pipe passage 5 and containing a piston 16, and on the opposite side of the piston is a valve chamber 17 connected to the auxiliary reservoir passage 11 and containing a main slide valve 18 and an auxiliary slide valve 19 adapted to be operated by the piston 16 through the piston stem 20.

The emergency valve casing 3 contains an emergency valve device indicated generally at 21, a quick action vent valve device indicated generally at 22, an inshot valve device indicated generally at 23, and a timing valve device indicated generally by the reference character 24.

The emergency valve device 21 comprises a piston 26 having a piston chamber 27 at one side thereof connected to the brake pipe passage 5 and on the opposite side of the piston is a valve chamber 28, connected through passage 29 with a quick action chamber 30, and containing a main slide valve 31 and an auxiliary slide valve 32 adapted to be operated by the piston 26 through the piston stem 33.

The vent valve device, indicated generally at 22, comprises a piston 34 having the piston chamber 35 on one side thereof connected to the passage 36 leading to the seat of the slide valve 31. A vent valve 37 contained in the valve chamber 38 is adapted to be operated by the piston 34 through the piston stem 39.

The inshot valve, indicated generally by the reference character 23, comprises a valve piston or movable abutment 40 having a stem 41 adapted to operate a valve 42 contained in the valve chamber 43. A spring 44 urges the valve piston 40 into engagement with a seat rib 45 and normally holds the valve 42 unseated. The valve 42 has a spring 46 associated therewith and urging the valve 42 into engagement with the seat rib 47 on movement of the piston 40 to the left as viewed in the drawing.

The inshot valve device 23 has means associated therewith to vent the chamber 50 on the spring side of the piston or movable abutment 40, and as shown in the drawing, this means comprises a valve element 51 having a grooved stem portion 52 positioned in a passage communicating with the chamber 50 and having a seat portion 53 adapted to engage a seat formed in the casing section 54 and surrounding the passage leading from the chamber 50. A spring 55 is provided which normally presses the valve member 51 to the right as viewed in the drawing so as to cut off communication between the chamber 50 and the atmosphere.

The timing valve device 24 comprises a flexible diaphragm 90 adapted to engage a seat rib 91 and subject to the pressure of a spring 92 which urges the diaphragm away from the seat rib. The chamber 93 on one side of the diaphragm 90 is connected to a passage 94 leading to the valve chamber 28 and a chamber 95 on the opposite side of the diaphragm is connected to the brake cylinder passage 8.

In operation, when the brake pipe 4 is charged with fluid under pressure fluid flows through the passage 5 to the piston chamber 15, and the piston 15 being in the release position as shown in the drawing, fluid under pressure flows from the piston chamber 15 through the feed groove 63 to the valve chamber 17 and thence through the passage 11 to the auxiliary reservoir 9 thus charging the auxiliary reservoir at the pressure carried in the brake pipe.

In the release position of the triple valve, the emergency reservoir passage 14 registers with a port 64 through the main slide valve 18, which port is now uncovered by the auxiliary valve 19 so that fluid under pressure is supplied from the valve chamber 17 to charge the emergency reservoir 12 with fluid at the pressure carried in the brake pipe. In the release position the brake cylinder 6 is connected to the atmosphere through the pipe 7, the passage 8 past the open inshot valve 42 to the passage 65 and through the cavity 66 in the main slide valve 18 to the atmospheric exhaust passage 67.

Fluid from the brake pipe 4 also flows through the passage 5 to the piston chamber 27 of the emergency valve device 21 and with the piston 26 in the release position as shown in the drawing fluid flows from the piston chamber 27 through the port 68 to the passage 29 and thence to the quick action chamber 30 and to the emergency valve chamber 28.

If it is desired to effect a service application of the brakes, a gradual reduction in brake pipe pressure is made and the triple valve piston 16 is thereby shifted from the release position, first moving the graduating valve 19 to uncover the service port 69 and to close the port 64. The main slide valve 18 is then moved by the piston 15 until the service port 69 registers with the passage 65.

Fluid under pressure is then supplied to the brake cylinder through the passage 65 to the valve chamber 43 of the inshot valve device 23 and thence past the open inshot valve 42 through the passage 8 in the brake cylinder. The chamber 50 on the spring side of valve piston 40 is connected by a passage 72 leading to the seat of the emergency slide valve 31. In the release position of the valve 31 a cavity 73 connects the passage 72 with the passage 65 so that the chamber 50 is subject to the pressure of fluid flowing to the brake cylinder in effecting a service application of the brakes. A passage 74 connects the chamber 50 with a chamber 75 at the opposite side of the valve piston 40 and outwardly of the seat rib 45 so that during a service application of the brakes the fluid pressures on the opposite sides of the valve piston or movable abutment are maintained equal, permitting the spring 44 to hold the valve piston against the seat rib 45 and to hold the valve 42 unseated.

Upon a gradual service rate of reduction in the brake pipe pressure the emergency piston 26 is moved so as to shift the auxiliary valve 32 to a position in which the port 76 in the auxiliary valve 32 registers with a port 77 in the main valve 31, the port 77 registering with an atmospheric exhaust passage 78 so that fluid under pressure is vented from the valve chamber 28 to the atmosphere. The rate at which fluid pressure in the valve chamber 28 and in the quick action chamber 30 is reduced is equal to the rate at which the brake pipe pressure is reduced in effecting a service application, so that if the rate of reduction in brake pipe pressure does not exceed the service rate the piston 26 will not be operated to shift the main valve 31 to the emergency application position.

When the brake pipe pressure is increased to effect a release of the brakes the triple valve piston 16 is shifted to the release position in which the feed groove 63 is open to permit the recharge of the auxiliary reservoir 9 from the brake pipe and in which the brake cylinder 6 is connected to the atmosphere through cavity 66 as hereinbefore described.

Upon a sudden emergency rate of reduction in brake pipe pressure the triple valve piston 16 is shifted to application position as in a service application of the brakes so that fluid under pressure is supplied from the auxiliary reservoir to the brake cylinder as hereinbefore described.

The emergency piston 26 is also moved to emergency position by a sudden reduction in brake pipe pressure, and the main slide valve 31 is shifted to a position in which the passage 36 is uncovered by the slide valve 31. Fluid under pressure is then supplied from the valve chamber 28 to the quick action chamber 30 through the passage 36 to the piston chamber 35. The quick action piston 34 is then actuated to effect the unseating of the vent valve 37, and thereby fluid is vented from the brake pipe to the atmosphere by way of passage 5, past the unseated valve 31 to the chamber 79 which is open to the atmosphere through the port 80.

In emergency position a cavity 81 in the emergency slide valve 31 connects the passage 14 with the passage 65 so that fluid under pressure is supplied from the emergency reservoir 12 to the brake cylinder passage 65 and thence to the brake cylinder.

In the release position the chamber 50 on the spring side of the valve piston or movable abutment 40 is at atmospheric pressure since the chamber 50 is connected to the brake cylinder passage 65 through the passage 72, so that when the emergency slide valve 31 is moved to the emergency position, the passage 72, being blanked by the slide valve 31, the chamber 50 remains at atmospheric pressure. When the pressure of fluid flowing to the brake cylinder in an emergency application of the brakes has been increased to such a degree on the area of the valve piston 40 within the seat rib 45 which is exposed to such pressure as to overcome the pressure of the spring 44 the valve piston 40 will be shifted to the left permitting the valve 42 to seat. The rapid flow of fluid to the brake cylinder is then cut off but the pressure of fluid supplied to the brake cylinder during this initial inshot is sufficient to effect the movement of the brake cylinder piston so as to cause the brake shoes to engage the wheels.

With the valve 42 seated fluid can flow to the brake cylinder only by way of a restricted port 82 and during the period that fluid is flowing to the brake cylinder by way of this restricted port the brake cylinder pressure is built up at a sufficiently slow rate to permit the slack in the train to run in without causing excessive shocks.

There is a possibility, however, that leakage of fluid under pressure to the chamber 50 on the spring side of the piston 40 will interfere with the intended operation of the piston 40 and the valve means controlled thereby.

In the equipment provided by my invention means is provided to vent the chamber on the spring side of the piston 40 so as to prevent the building up of pressure in this chamber when the piston has been moved to a position to permit the valve associated therewith to restrict the rate of flow of fluid to the brake cylinder. As will be seen in the drawing when the piston 40 is moved to the left against the pressure of the spring 44 as a result of the building up of fluid under pressure on the opposite face of the piston it engages the end of the stem 52 of the valve element 51 so as to move the valve element away from the seat formed in the casing section 54 and permits any fluid under pressure in the chamber 50 to escape to the atmosphere through the passage 85. The valve 51 is held open so that there can be no building up of pressure in the chamber 50 as a result of leakage of fluid under pressure into the chamber and the valve 42, therefore, will remain seated.

In an emergency application fluid under pressure supplied from the valve chamber 28 to the quick action chamber 35 is gradually vented to the atmosphere by way of port 86 through the emergency piston 34 so that the pressure in the valve chamber 28 and quick action chamber 35 is gradually reduced.

The quick action chamber pressure acts in the chamber 93 on the diaphragm 90 of the timing valve device 24 and the pressure of the fluid supplied to the brake cylinder acts on the opposite side of the diaphragm in chamber 95. As a consequence after a period of time when the increase in brake cylinder pressure in the chamber 95 plus the pressure of the spring 92 is sufficient to overcome the reducing quick action chamber pressure in the chamber 93 the diaphragm 90 will be shifted to the right so as to open communication from the chamber 95 past the seat rib 91 to the passage 65.

The fluid pressure supply passage 65 is thus directly connected to the brake cylinder passage 8 permitting the brake cylinder pressure to be built up at a rapid rate.

From the foregoing it will be seen that the brake equipment provided by my invention has means operable subject to the pressure of fluid supplied to the brake cylinder during an emergency operation of the equipment to control the rate of flow of fluid to the brake cylinder and that it has means to insure that the operation of this means will not be affected by leakage of fluid around the valve means or the elements associated therewith or to other portions of the brake controlling equipment.

While one embodiment of the invention has been illustrated and described in detail it should be understood that the invention is not limited to these details and that numerous modifications and changes may be made without departing from the scope of the following claims.

Having now described my invention, what I claim as new and desire to secure by Letters Patent, is:

1. In a fluid pressure brake, in combination, a brake pipe, a brake cylinder, a brake controlling valve device controlling the supply and release of fluid under pressure to and from the brake cylinder, the valve device having a service position and an emergency position, and valve means having a valve element controlling the rate at which fluid under pressure is supplied to the brake cylinder, said valve means having a movable abutment subject on one side to the pressure of fluid supplied to the brake cylinder and subject on the other side to the pressure of fluid in a chamber communicating with the passage through which fluid under pressure is supplied to the brake cylinder, means operable on movement of the brake controlling valve device to the emergency position to cut off the communication through which fluid under pressure is supplied to said chamber, a communication between said chamber and the atmosphere, and means controlling the flow of fluid through said communication.

2. In a fluid pressure brake, in combination, a brake pipe, a brake cylinder, a brake controlling valve device controlling the supply and release of fluid under pressure to and from the brake cylinder, the valve device having a service position and an emergency position, and valve means having a valve element controlling the rate of which fluid under pressure is supplied to the brake cylinder, said valve means having a movable abutment subject on one side to the pressure of fluid supplied to the brake cylinder and subject on the other side to the pressure of fluid in a chamber communicating with the passage through which fluid under pressure is supplied to the brake cylinder, biasing means associated with said valve means and normally urging the abutment to a position in which the valve element associated therewith is in a position to permit fluid to flow to the brake cylinder at one rate, means operable on movement of the brake controlling valve device to the emergency position to cut off the communication through which fluid under pressure is supplied to said chamber, a communication between said chamber and the atmosphere, and means controlling the flow of fluid through said communication.

3. In a fluid pressure brake, in combination, a brake pipe, a brake cylinder, a brake controlling valve device controlling the supply and release of fluid under pressure to and from the brake cylinder, the brake valve device having a service position and an emergency position, and valve means having a valve element controlling the rate at which the fluid under pressure is supplied to the brake cylinder, said valve means having a movable abutment subject on one side to the pressure of fluid supplied to the brake cylinder and subject on the other side to the pressure of fluid in a chamber communicating with the passage through which fluid under pressure is supplied to the brake cylinder, means operable on movement of the brake controlling valve device to the emergency position to cut off the communication through which fluid under pressure is supplied to said chamber whereby pressures of different values are operative on opposite sides of the abutment and whereby the abutment is moved to a position to permit the valve element associated therewith to move to a position to restrict the flow of fluid to the brake cylinder, a passage communicating with said chamber and with the atmosphere and valve means associated with the movable abutment and controlling said passage, said valve means being adapted to open said passage when the movable abutment is moved to a position to permit the valve element associated therewith to move to a position to restrict the flow of fluid to the brake cylinder.

4. In a fluid pressure brake, in combination, a brake pipe, a brake cylinder, a brake controlling valve device controlling the supply and release of fluid under pressure to and from the brake cylinder, the brake controlling valve device having a service portion and an emergency portion, and valve means having a valve element controlling the rate at which fluid under pressure is supplied to the brake cylinder, said valve means having a movable abutment subject on one side to the pressure of fluid supplied to the brake cylinder and subject on the other side to the pressure of the fluid in a chamber communicating with the passage through which fluid under pressure is supplied to the brake cylinder, biasing means associated with said valve means and normally urging the abutment to a position in which the valve element associated therewith is in a position to permit fluid to flow to the brake cylinder at one rate, means operable on movement of the brake controlling valve device to the emergency position to cut off communication through which fluid under pressure is supplied to said chamber whereby fluid pressures of different values are operative on different sides of the abutment and whereby the abutment is moved against the biasing means to a position to permit the valve element associated therewith to move to a position to restrict the flow of fluid to the brake cylinder, a passage communicating with said chamber and with the atmosphere, and valve means associated with the movable abutment and controlling said passage, said valve means being adapted to open said passage when the movable abutment is moved to a position to permit the valve element associated therewith to move to a position to restrict the flow of fluid to the brake cylinder.

5. In a fluid pressure brake, in combination, a brake pipe, a brake cylinder, an auxiliary reservoir, an emergency reservoir, a brake controlling valve device having a service portion operated on a reduction in brake pipe pressure to supply fluid under pressure from the auxiliary reservoir to the brake cylinder and an emergency portion operated on a sudden reduction in brake pipe pressure to supply fluid under pressure to the brake cylinder from the emergency reservoir, and a valve device having a valve element controlling the rate at which fluid is supplied to the brake cylinder, the valve device comprising a movable abutment subject on one side to the pressure of the fluid supplied to the brake cylinder, and subject on the other side to the pressure of the fluid in a chamber communicating with the passage through which fluid under pressure is supplied to the brake cylinder, biasing means associated with said valve device and urging the valve element to a position to permit fluid under pressure to flow to the brake cylinder at one rate, the emergency portion of the brake controlling valve device having means associated therewith and operable to cut off the flow of fluid to said chamber when said emergency portion of the valve device is in a position to permit fluid to flow from the emergency reservoir to the brake cylinder, a passage communicating with said chamber and with the atmosphere, and valve means controlled by said movable abutment and controlling the communication through said passage, said valve means being adapted to open said passage when the abutment is moved to a position to permit the valve element associated therewith and controlling the rate of flow of fluid to the brake cylinder to move to a position to restrict the flow of fluid to the brake cylinder.

6. In a fluid pressure brake, in combination, a brake pipe, a brake cylinder, a brake controlling valve device controlling the supply and release of fluid under pressure to and from the brake cylinder and comprising a service portion operated on a reduction in brake pipe pressure to supply fluid under pressure to the brake cylinder and an emergency portion operated on a sudden reduction in brake pipe pressure to supply fluid under pressure to the brake cylinder, and valve means having a valve element controlling the rate at which fluid is supplied to the brake cylinder, the valve means including a movable abutment associated with said valve element and subject on one side to the pressure of the fluid supplied to the brake cylinder, and subject on the other side to the pressure of fluid in a chamber communicating with the passage through which fluid is supplied to the brake cylinder, and means controlled by the emergency portion of the brake controlling valve device to cut off the communication through which said chamber is supplied with fluid under pressure when said emergency portion is conditioned to supply fluid to the brake cylinder, a passage communicating with said chamber and with the atmosphere, and valve means controlled by said movable abutment and controlling communication through said passage, said valve means being adapted to open said passage when the movable abutment is moved to a position to permit the valve element associated therewith and controlling the rate of flow of fluid to the brake cylinder to move to a position to restrict the flow of fluid to the brake cylinder.

7. In a fluid pressure brake, in combination, a brake pipe, a brake cylinder, a brake controlling valve device controlling the supply and release of fluid under pressure to and from the brake cylinder and comprising a service portion operated on a reduction in brake pipe pressure to supply fluid under pressure to the brake cylinder and an emergency portion operated on a sudden reduction in brake pipe pressure to supply fluid under pressure to the brake cylinder, and valve means having a valve element controlling the rate at which fluid is supplied to the brake cylinder, the valve means including a movable abutment associated with said valve element and subject on one side to the pressure of the fluid supplied to the brake cylinder, and subject on the other side to the pressure of fluid in a chamber communicating with the passage through which fluid is supplied to the brake cylinder, biasing means associated with said abutment and urging the valve element to a position to permit fluid under pressure to flow to the brake cylinder at one rate, and means controlled by the emergency portion of the brake controlling valve device to cut off the communication through which said chamber is supplied with fluid under pressure when said emergency portion is conditioned to supply fluid to the brake cylinder, a passage communicating with said chamber and with the atmosphere, and valve means controlled by said movable abutment and controlling communication through said passage, said valve means being adapted to open said passage when the movable abutment is moved to a position to permit the valve element associated therewith and controlling the rate of flow of fluid to the brake cylinder to move to a position to restrict the flow of fluid to the brake cylinder.

8. In a fluid pressure brake, in combination, a brake pipe, a brake cylinder, a brake controlling valve device operated upon a reduction in brake pipe pressure for supplying fluid under pressure to the brake cylinder, valve means for controlling a communication through which fluid under pressure is supplied to the brake cylinder, a movable abutment subject on one side to the pressure of fluid supplied to the brake cylinder for operating said valve means to effect a reduction in the rate of flow of fluid to the brake cylinder and means operated by said abutment for venting the chamber at the opposite side of the abutment.

9. In a fluid pressure brake, in combination, a brake controlling valve device operated on an emergency reduction in brake pipe pressure for supplying fluid under pressure to the brake cylinder, valve means for controlling a communication through which said brake controlling valve device supplies fluid under pressure to the brake cylinder, a movable abutment normally maintaining said valve means in the open position and movable upon a predetermined increase in brake cylinder pressure acting on one side to permit said valve means to close, and a valve operated by the movement of said abutment for venting the chamber at the opposite side of said abutment.

10. In a fluid pressure brake, in combination, a brake pipe, a brake cylinder, a brake controlling valve device controlling the supply and release of fluid under pressure to and from the brake cylinder, the valve device having a service position and an emergency position, valve means for controlling a communication through which fluid under pressure is supplied to the brake cylinder, a movable abutment for operating said valve means, said movable abutment being subject on each side to the pressure of fluid supplied to the brake cylinder on movement of the valve device to the service position, and means operable on movement of the valve device to the emergency position for cutting off the communication through which fluid is supplied to one side of said abutment and for opening a communication through which the chamber on said side of the abutment is vented.

11. In a fluid pressure brake, in combination, a brake pipe, a brake cylinder, a brake controlling valve device controlling the supply and release of fluid under pressure to and from the brake cylinder, the valve device having a service position and an emergency position, valve means for controlling a communication through which fluid under pressure is supplied to the brake cylinder, a movable abutment for operating said valve means, said movable abutment being subject on each side to the pressure of fluid supplied to the brake cylinder on movement of the valve device to the service position, means operable on movement of the valve device to the emergency position for cutting off the communication through which fluid is supplied to one side of the abutment, and means operated by said abutment for venting the chamber on said side of the abutment.

12. In a fluid pressure brake, in combination, a brake pipe, a brake cylinder, a brake controlling valve device controlling the supply and release of fluid under pressure to and from the brake cylinder, the valve device having a service portion and an emergency portion, valve means controlling a communication through which fluid under pressure is supplied to the brake cylinder, a movable abutment for operating said valve means, said abutment being subject on one side to the pressure of fluid supplied to the brake cylinder, and being subject on the other side to the pressure of fluid in a chamber communicating with the communication through which fluid under pressure is supplied to the brake cylinder, means controlled by the emergency portion of the valve device and operable on movement of the emergency portion of the valve device to a position to supply fluid to the brake cylinder to cut off the communication through which fluid is supplied to said chamber, and means operated by said abutment for venting said chamber.

JOHN N. GOOD.